INVENTOR
JOSEPH E. McWILLIAMS

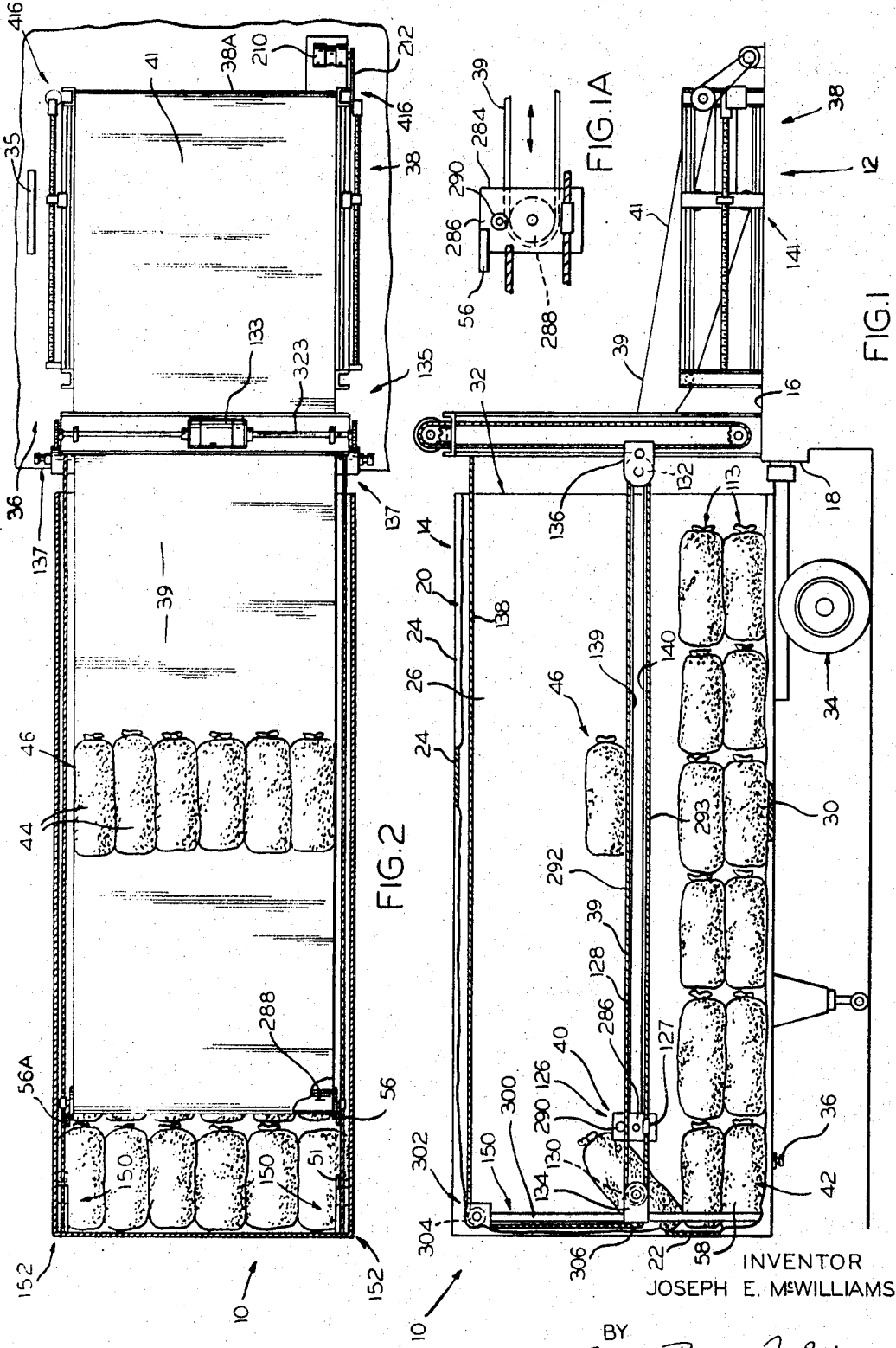

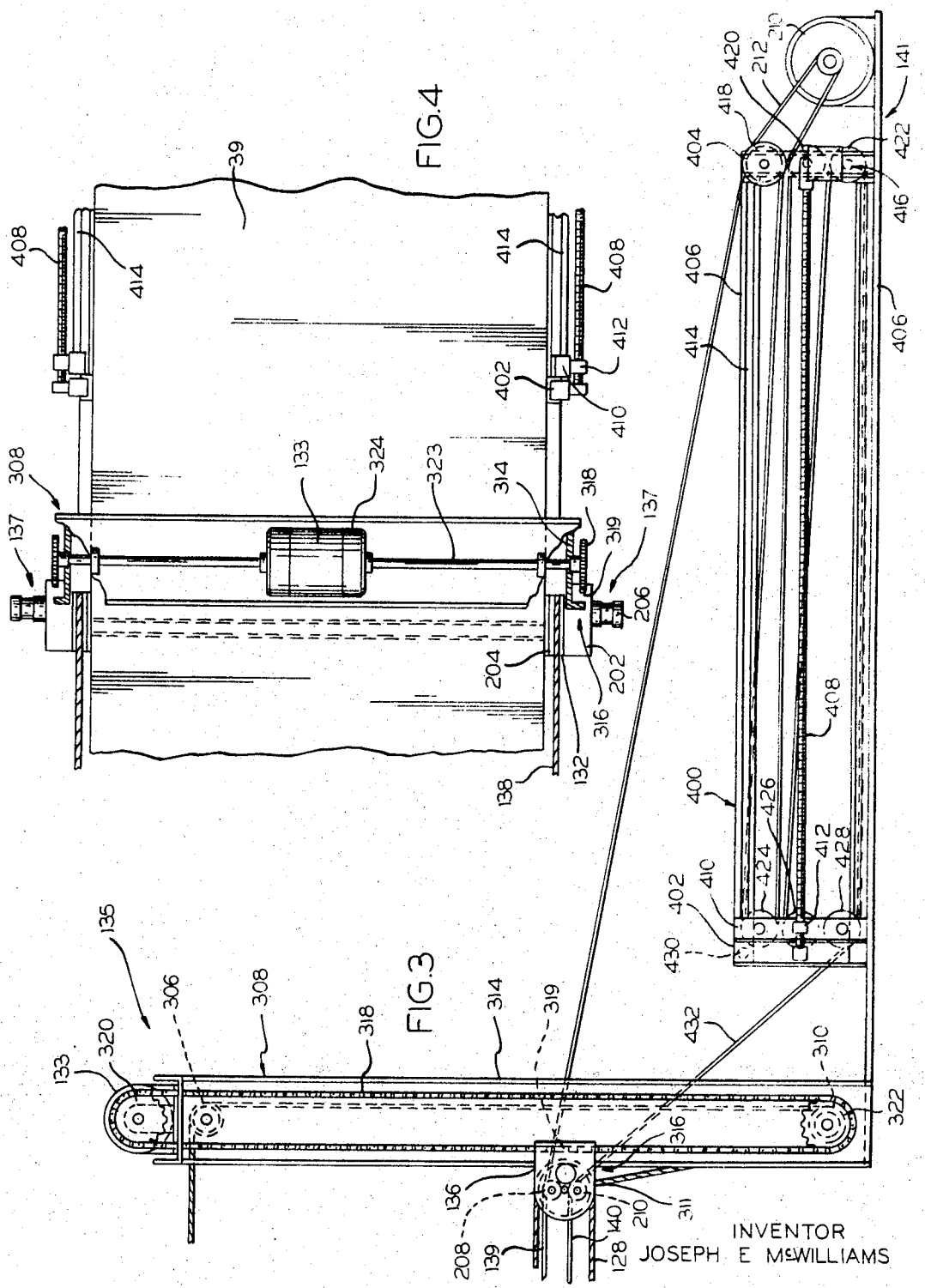

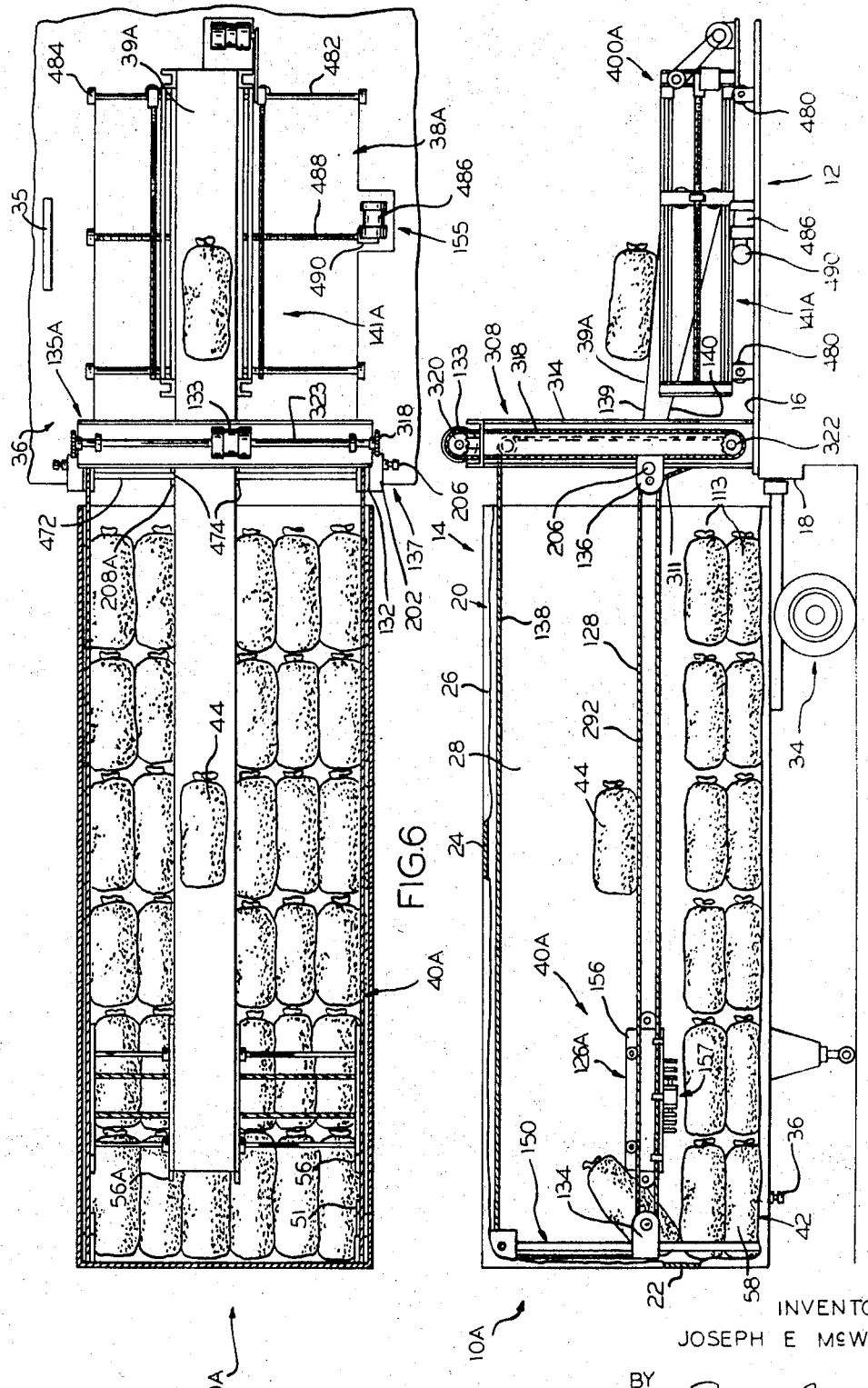

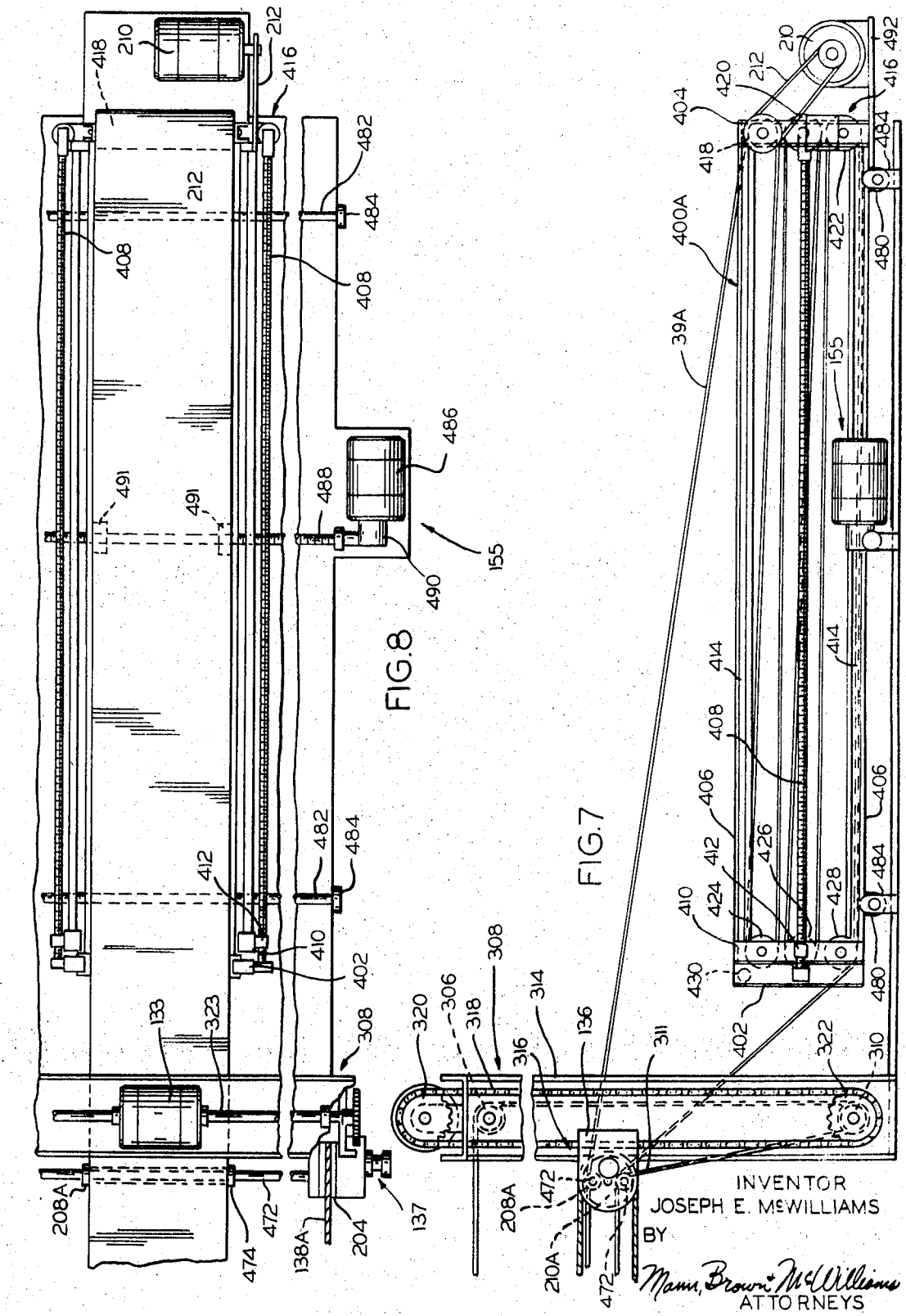

BY
Mann, Brown, McWilliams
ATTORNEYS

United States Patent Office 3,471,037
Patented Oct. 7, 1969

3,471,037
APPARATUS FOR LOADING BAGGED MAIL FROM A LOADING DOCK INTO A HIGHWAY VEHICLE
Joseph E. McWilliams, 1345 Canterbury Lane, Glenview, Ill. 60025
Continuation-in-part of application Ser. No. 694,151, Dec. 28, 1967. This application Mar. 14, 1968, Ser. No. 713,009
Int. Cl. B65g 57/00, 67/04
U.S. Cl. 214—6      6 Claims

ABSTRACT OF THE DISCLOSURE

The invention relates to the loading of mail bags from a loading dock into an end loading highway vehicle, such as a truck or a trailer, to fully load the vehicle with stacks of mail bags in which the bags are compactly loaded into place in individual stack forming tiers without those performing the bag loading operation having to enter the vehicle. In practicing the invention, the loading dock at the post office or the like is provided with a conveyor apparatus on which out-going bags are placed and oriented in closely spaced tier form to form a stack forming tier unit. The conveyor apparatus includes a belt that extends between it and a carriage operating to move into and out of the vehicle, in which the carriage is in the form of a carrier suspended between vertically movable horizontally disposed closed loop cable conveyors that are temporarily suspended between the dock and the forward end of the vehicle. The belt is trained over and around the carrier so that the tier load when once placed on the conveyor at the loading dock may be moved into vehicle, without disturbing the orientation of the bags, and be brought to the vehicle loading area for discharge of the stack forming tier unit, which is done by effecting placement of the tier as part of a stack in the vehicle, again without disturbing the orientation of the bags. The bags are deposited to form horizontally extending layers, and the conveyor is shortened and raised, by appropriately moving the carrier as the vehicle is filled up.

The carriage and belt movements are controlled so that the individual tier loads are formed into vertical stacks of mail bags that are disposed to position the bags of adjacent stacks in closely spaced relation, with the vehicle being thus filled with bags throughout its load receiving area so as to make maximum use of the available loading space within the vehicle to maximize the pay load. The operation of the carriage is mechanized so that workers do not have to go into the vehicle, and palleting of the bags in groups is avoided while still achieving uniform loading in tier form.

---

This application is a continuation-in-part of my application Ser. No. 694,151, filed Dec. 28, 1967.

This invention relates to a method and apparatus for loading bagged mail from a loading dock into a highway vehicle, and more particularly, to methods of and means for facilitating the handling of bagged mail in tiered groups for purposes of loading same into vehicles that are to transport it.

Conventional methods of loading mail bags into highway vehicles and trailers of the end loading type are not only time consuming and inefficient in nature, but also require much manual effort on the part of the workers involved. The bags are conventionally loaded so as to form vertical stacks in which the bags of each stack extend longitudinally of the vehicle and the stacks fill all available space vertically and lengthwise of the vehicle. The bags, which when loaded are from 12–14 inches wide and 36–40 inches long, are usually loaded up to about 92 inches above the floor of the truck in a space that is about eight feet wide, with the length depending on the length of the truck.

Heretofore the loading procedures have been largely manual in nature, with the workers involved dragging the individual bags into the vehicle from a pile of the bags on the adjacent loading dock, and then individually positioning and lifting the bag as is necessary to complete the formation of the respective bag stacks. At best, hand carts are sometimes employed to reduce some of the manual effort involved, but the handling required of each individual bag is still much the same; in both cases, much repetition of bag orienting movements is required for each bag, which is wasteful of effort and inefficient in terms of the time and cost of getting the job done. The result is that valuable equipment is unduly tied up to accommodate these slow loading procedures, and labor is in short supply as workers are becoming increasily reluctant to take on jobs involving such hard work.

Nevertheless, the Post Office Department and others concerned with the transport of loaded mail bags, load something on the order of 50,000 trucks a day in the U.S.A. in this manner at a cost on the order of $18.00 a truck, which gives an indication of the magnitude of the problem.

My Patent 3,164,271, granted Jan. 5, 1965, discloses a basic system for handling bagged mail which involves the sorting and loading of incoming bags into tier load units that are grouped by destination and stored until arrival of a suitable load transport vehicle whereupon the tier load units are unloaded in single or multiple tier form in the vehicle.

A principal objective achieved by the methods and apparatus disclosed in said patent is that the mail bags are oriented early in the cycle of their handling operations and this initial orientation is maintained throughout all of the subsequent handling operations.

The present application is directed to the effectation of this principal objective in terms of loading mail bags from a loading dock or the like into a highway vehicle.

A principal object of the present invention is to provide methods and apparatus for further facilitating the loading of end opening vehicles without requiring that the operator enter the transport vehicle or that the mail bags be palleted in groups to reduce individual handling.

Another principal object of this invention is to provide a method of loading bagged mail in transport vehicles in closely spaced relationship to the end that the available air spaced within the vehicle will be loaded to the maximum and all manual motions ordinarily required to handle the bags within the vehicle are performed by mechanical means arranged to carry, elevate as necessary and deposit the bags in the compact relationship necessary to maximize the pay load by substantially filling the available cubic loading space of the vehicle.

Another principal object of the invention is to provide methods and apparatus for loading of end opening vehicles such as motor trucks and trailers which permits a single operator to efficiently load the entire transport vehicle without stepping inside it.

Still other objects of the invention are to provide apparatus for loading bagged mail in transport vehicles that is adapted for full push button type actuation and control, to provide methods and apparatus for handling bagged mail that permits substantially automatic handling of the mail in tiered load groups, and to provide mail bag handling apparatus that is economical of manufacture, convenient in use, and adapted for all conventional mail bag loading dock areas and vehicles or their equivalents.

Other objects, uses, and advantages will be obvious or become apparent from a consideration of the following detailed description and the application drawings.

In the drawings:

FIGURE 1 is a diagrammatic side elevational view of a semi-trailer in the process of being loaded in accordance with my present invention, with parts being broken away, and the mail bag tier carrying conveyor being shown in position to convey a mail bag tier from the loading dock to a discharge position adjacent the forward end of the vehicle and in stack forming relation on top of previously deposited tier loads;

FIGURE 1A is a side elevational view of the cable supported carriage that is mounted for operation within the vehicle, and which supports the discharge end of the belt conveyor;

FIGURE 2 is a plan view of the apparatus shown in FIGURE 1;

FIGURE 3 is a side elevational view, similar to that of FIGURE 1, but on an enlarged scale, of the loading dock supported portion of the conveyor and its driving and extending and contracting mechanisms;

FIGURE 4 is a plan view of a portion of the showing of FIGURE 3;

FIGURES 5 and 6 are views similar to those of FIGURES 1 and 2 respectively, but illustrating a modified embodiment of the invention adapted to deposit one mail bag at a time to form the individual stack tiers;

Figure 9:
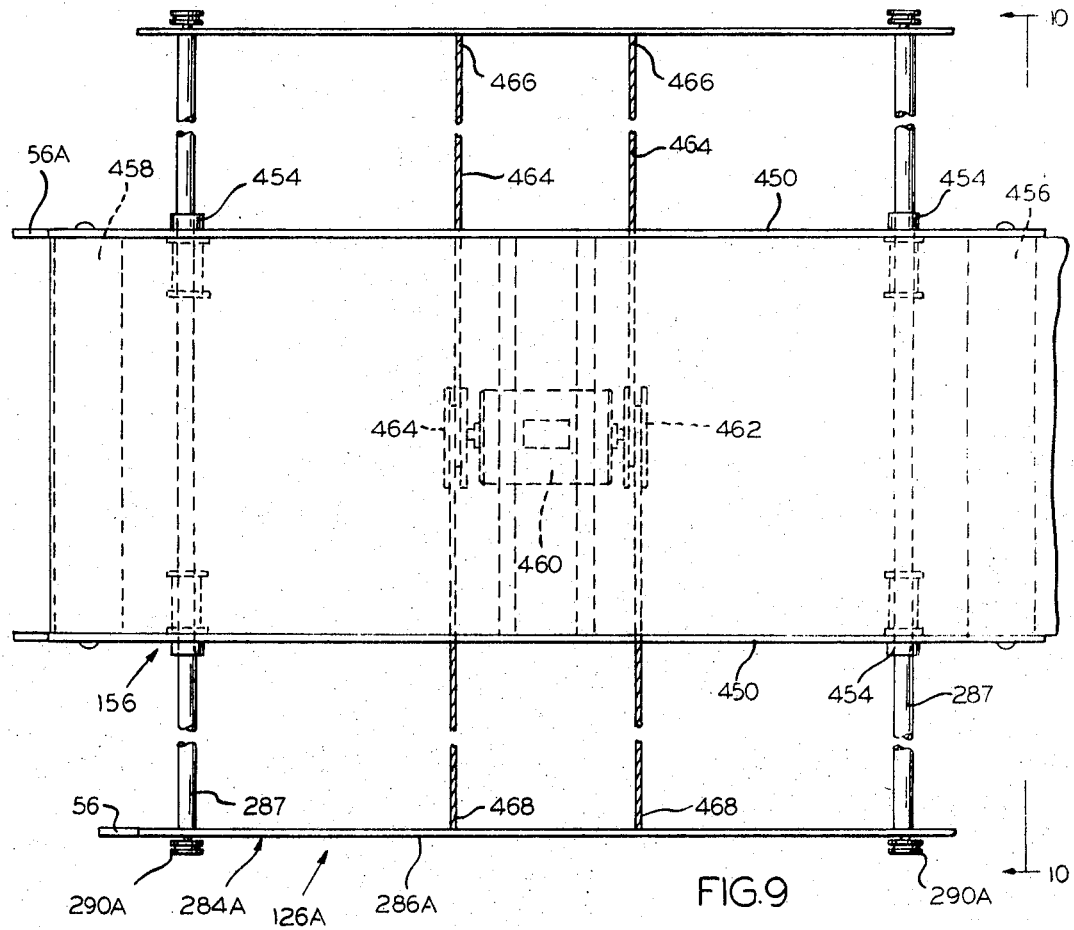

FIGURES 7 and 8 are similar to those of FIGURES 3 and 4, respectively, but illustrating the embodiment of FIGURES 5 and 6;

FIGURE 9 is a plan view of the carriage of the embodiment of FIGURES 5–8; and

Figure 10:
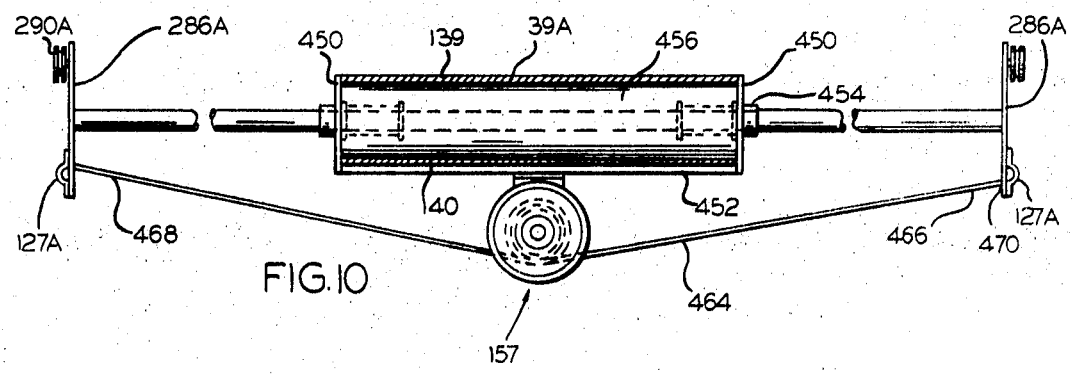

FIGURE 10 is an end elevational view of the carriage of FIGURE 9, taken along line 10—10 of FIGURE 9.

However, it is to be distinctly understood that the specific embodiments of the invention illustrated are supplied primarily to comply with the requirements of the Patent Code, and that the invention may have other embodiments.

General description

Reference numeral 10 of FIGURES 1 and 2 generally indicates one embodiment of the present invention that incorporates the basic approach of my said application Ser. No. 694,151 for loading mail bags from a loading dock 12 into an end loading vehicle 14, which has been illustrated as being in the form of the familiar semi-trailer, although the invention is readily applicable to any end loading vehicle.

It is assumed that the mail bag handling installation involved includes the loading dock 12 (of a post office or the like) that is conventionally provided with a level load support surface 16 and the usual shoulder or end 18 against which the vehicle 14 is backed up for purposes of being loaded.

It is also assumed that the vehicle 14 be in the form of the usual body 20 defined by forward end wall 22, top wall 24, side walls 26 and 28, floor 30, and end opening 32 that is customarily closed by suitable doors or the like (not shown). The body 20, being of the semi-trailer type, rides on the usual rear wheels 34 and is provided with the usual kingpin 36 for connection to the fifth wheel of a conventional tractor truck (not shown).

In accordance with this invention, there is associated with the loading dock 12 at the position 36 where the vehicle body 14 is to be stationed for loading purposes a mail bag receiving conveyor apparatus 38 that includes a belt conveyor 39 extending between it and a carriage 40 over which belt 39 is trained (see FIGURE 1A), which belt receives a tier load of bags at apparatus 38 and transports the bags involved into the vehicle 14 and discharges them in tier form to form mail bag stacks 42.

Under ordinary circumstances, the loading dock 12 is located at a post office or the like where loaded mail bags are processed for shipment to their destinations, and as indicated in FIGURE 2, the conveyor apparatus 38, conveyor belt 39, and the carriage 40 are longitudinally aligned with the vehicle 14 (in the loading position of the vehicle) and have a width transversely thereof to accommodate enough mail bags 44 laid side by side in a row to form one complete tier 46 of a stack 42, such that when the tier is placed within the vehicle 14, it will extend susbtantially from one side wall 26 to the other side wall 28 as indicated in FIGURE 2. Conveyor belt 39 defines an upwardly facing load supporting surface 41 on which the bags 44 are placed, which surface, at least at the lower, loading end 38A of conveyor 38, is at an easy reach height above surface 16, such as two to three feet high.

The carriage 40 comprises a load support in the form of a carrier 126 suspended between cables 128 mounted on either side of the vehicle in the form of closed loops and trained over suitable end pulleys 130 and 132. Pulleys 130 and 132 are respectively journaled in the respective vertically movable supports 134 and 136 which are horizontally aligned and simultaneously raised and lowered by operation of cables 138 by power mechanism 133 which is associated with the control mechanism 135 best illustrated in FIGURES 3 and 4. The carrier 126 is fixed to the respective cables 128 at lugs 127 on either side thereof and the cables 128 are powered by suitable drive mechanisms 137 (FIGURES 3 and 4) to move the carriage 40 forwardly and rearwardly of the vehicle. At the loading dock apparatus 38, belt conveyor 39 is trained over a belt take up apparatus 141 that accumulates the belting as carrier 126 moves to the rear of vehicle 14 so that the belt upper and lower runs 139 and 140 stay taut in the manner suggested in the drawings.

In the form of FIGURES 1–4, the cables 128 and the support members 134 cooperate with special prop devices 150 permanently located at the respective forward corners 152 of the vehicle 10.

In practicing my invention, the mail bags are brought in any suitable manner to the area of the conveyor apparatus 38 and they may be piled at random adjacent the apparatus 38 for ready access by one or more workers stationed adjacent the apparatus 38 for purposes of controlling the operation of same and carriage 40. In accordance with this invention, the controls for conveyor apparatus 38 and carriage 40 are arranged so that these pieces of apparatus are operated without anyone having to go into the vehicle 14, as will be hereinafter described in connection with the embodiments of the invention illustrated in the drawings. For this purpose, the controls may be of the push button type applied to suitable control panel 35 and may be of any suitable electric and/or electronic type that will serve the purpose.

To practice my invention, after the vehicle 14 is positioned as shown in FIGURES 1 and 2 for loading (assuming it is empty), the cables 128 and 138 are connected as indicated, and the bags to be shipped are disposed, for instance in a pile or piles adjacent the conveyor 38, the worker or workers in the area of conveyor 38 pick up and position enough of the individual bags 44 to form one or more tiers 46 (of six to eight bags in a tier) on the belt 39 of apparatus 38 in which, in accordance with the procedure contemplated by this embodiment of the invention, the bags of each tier 46 are placed in closely spaced side by side relation and extend longitudinally of the conveyor 39 and vehicle 14. Assuming the vehicle 14 is empty, cables 128 are lowered to dispose carrier 126 to be no more than 24 inches above the floor 30, and carrier 126 is moved forwardly into the vehicle until its forward end 50 engages a stop 51 on one of the prop devices 150, which actuates a suitable limit switch arrangement, such as that indicated at 56, to stop forward movement of the carrier 126 and start rearward movement back to the position of FIGURE 1, whereupon movement longitudinally of the vehicle is stopped automatically by suitable controls associated with panel 35. This is the position in which a mail bag will drop from conveyor 39 to the forwardmost position indicated in FIGURE 1. The belt take up device 141 moves from the position of FIGURE 3 to the position of FIGURE 1 to provide the additional belt length necessary to accommodate this positioning of carrier 126.

In applying the tiers to the conveyor 39, it is preferable to first form one tier and then actuate conveyor 39 to move that tier a short distance into the vehicle, after which conveyor 39 is stopped to apply another tier load thereto. The tier spacing suggested by FIGURE 1 is preferred to avoid overloading belt 39.

When one or more tiers 46 have been applied to conveyor 39 at apparatus 38 in the manner indicated (which tiers are termed a "partial transport vehicle load depth unit" in the appended claims), the conveyor belt 39 is actuated to move the tiers then applied to belt 39 into the vehicle 14 where the first tier moves toward the front wall 22 of the vehicle to start the first row 58 of mail bags. The first tier moves forwardly of the vehicle 14 until its forward end rides over the forward end 50 of the belt, whereupon the first tier of bags is dropped onto the floor 30 of the vehicle adjacent the end wall 22 in the position indicated at 58, and carrier 126 is actuated to move rearwardly of the vehicle to permit the bags of the first tier to lie flat in the position illustrated. For this purpose, carrier 126 is provided with an electric eye device 56A or the like that senses the passage of a tier load over carrier 126 and is operably connected to the electrical systems involved so that carrier 126 is automatically actuated in a rearward direction the amount required to permit release of the first tier, after which the carrier returns to the position of FIGURE 1.

The belt 39 continues to operate to unload the next tier in a similar manner where indicated at 60, the cables 128 being elevated as required to place thte new tier on top of that already in place (belt take up apparatus 141 being operated as required to release the necessary belt length), and for this purpose controls actuated by electric eye 56A automatically raise carrier 126, after a suitable time delay to allow accurate deposit of the first tier load, to the level that will effect accurate deposit of the next tier load.

The belt is then stopped and one or more tiers applied thereto in the manner indicated, with the belt 39 and the other apparatus involved then being actuated in the manner suggested to deposit the new tiers on top of those already in place. This is repeated to form a completed stack adjacent the wall 22 up to the height desired, after which the stacking process is repeated to form the next adjacent stack with the carrier 126 and belt 39 being disposed and operated as indicated as required to achieve this end (the controls involved being arranged to provide the positioning control needed to do this through control panel 35). This process is repeated until the vertical stacks of mail bags have been formed the length of vehicle 14 (in which position carrier 126 will be disposed adjacent the vehicle opening 132), after which the cables 128 are disconnected and removed from vehicle 14, carrier 126 is rested on loading dock 12, and cables 138 are disconnected from mechanism 135 and their free ends inserted into the vehicle. The vehicle open end 32 is then secured in the usual manner and the vehicle 14 driven off to be replaced by a similar vehicle 14 to be loaded and carrying similar equipment to that illustrated.

Alternately, the vertical stacks may be formed by consecutively forming horizontally disposed layers 113 of tiers 46, as indicated in FIGURE 1. In doing this, the carrier 126 is maintained at its initial elevation above the floor 30 of vehicle body 14 until the first bag layer 113 is in place between forward wall 22 and door opening 32 (carrier 126 being moved rearwardly one tier position after deposit of each bag tier, under control of electric eye 56A), after which the carrier 126 is raised, by operating mechanism 133, into a position suitable for forming the next layer 113. This is repeated until the vehicle is filled. Carrier 126 is moved rearwardly and forwardly of the vehicle as required by motivating cables 128 through drive mechanisms 137.

If desired, the loading operation can be done with continuous operation of belt 39, as by applying stripes (painted or otherwise) down the upwardly facing surface 41 of belt 39 spaced apart laterally of the belt one bag width, and loading the bags 44 one at a time onto the conveyor 39 by applying them to consecutive bag receiving spaces between the stripes. When one tier of a stack in the vehicle is completed, the carrier 126 is shifted to start the next, and so on, until the vehicle is loaded.

The handling of the bags in moving them from the conveyor apparatus 38 to their respective positions in the vehicle 14 is thus carried out after having made a single orientation of the bag as to the position it is to take in a particular stack forming tier, and without having to drop the bag over the 24 inch limitation provided for by Post Office regulations.

From the description so far there are several important features to be observed. Note for one thing that the bags 44 are properly oriented in their tiers 46 by their application to the conveyor belt 39, and that this orientation is maintained throughout the further handling of the bags that moves them into stacked relation in the vehicle 14. Furthermore, the lifting and positioning of the bag 44 onto conveyor apparatus 38 is the only manual labor involved, and the worker is concerned with only an easy lifting and positioning action at a convenient working height above surface 16, with such action needing only to be performed once per bag.

It is also to be noted that the loading of the vehicle 14 is done without anyone having to enter the vehicle 14, and palletizing of the individual tiers 14 is unnecessary.

In the modified form 10A of FIGURES 5–10, the conveyor apparatus 38A, belt conveyor 39A, and carriage 40A are arranged to receive bags 44 in single file form, in which the bags extend longitudinally of the vehicle. Belt conveyor 39A is arranged similarly to belt conveyor 39, but is of a width laterally of the vehicle to accommodate only one bag (see FIGURE 6). Belt take up apparatus 141A or conveyor apparatus is mounted to shift sideways of the vehicle under the control of drive arrangement 155, while the carriage 40A is in the form of carrier 126A including a frame 156 (over which belt 39A is trained) that is mounted to shift laterally of the vehicle under the control of drive arrangement 157 (see FIGURES 9 and 10), with drive arrangements 155 and 157 being coordinated so that belt take up apparatus 141A and frame 156 move in synchronism laterally of conveyor 39A. Carrier 126A is supported and actuated by cables 128A and 138A in the manner already described, in which limit switch 56 serves the longitudinal positioning control previously described, electric eye 56A, carried in this instance by frame 156, controls automatic positioning of frame 156 sidewise of the vehicle, and the controls of the system include an automatic counter arrangement that automatically actuates cables 128A and/or 138A (through their respective drive mechanisms) after the desired number of bags has been laid down at a particular level, depending on whether the bags are being consecutively applied in vertical stacks 42 or horizontal layers 113, at the option of the operator, to effectuate complete loading of vehicle 14.

In utilizing this embodiment of the invention, after the cables 128A and 138A are connected as indicated, and the cables 128A lowered to dispose the carrier 126A of its lowermost unloading position (assuming vehicle 14 to be empty), which should be no more than 24 inches above floor 30, conveyor 39A may then be actuated and positioned to unload the first bag adjacent the forward wall 22 at one corner 150 thereof, whereupon the first bag 44 is applied to the conveyor 39A and proceeds into the vehicle where it is discharged onto the vehicle floor 30 at the position of bag row 58. As soon as the first bag 44 has dropped into place in the manner described in connnection with the embodiment of FIGURES 1–4, conveyor 39A is automatically shifted laterally of vehicle 14 by operation of the controls involved in the electric system in response to the signal generated by electric eye 56A as the first bag 44 passes through its beam, so that the next bag 44 when discharged by conveyor 39A will drop into the next available position in row 58, this next bag having been applied to conveyor 39A at a suitable time after the first bag 44 to allow for discharge of the first bag and the needed shifting movement of conveyor 39A. After the second bag 44 is dropped into place, conveyor 39A again shifts laterally automatically and is loaded as required to drop the next bag into place, this procedure continuing to complete the first bag row 58.

The carrier 126A and conveyor apparatus 38A are then subsequently positioned to dispose conveyor 39A as required to complete filling of the vehicle the exact methology depending on which loading procedure he elects to follow, and for this purpose the controls at panel 35 and the electrical system in general are arranged so that the operator can set the controls at panel 35 to automatically provided for the longitudinal and elevational positioning of conveyor in the sequence required for either laying the bags down sequentially in consecutive horizontally extending rows 113, or by consecutively forming vertical stacks 42 from the front to the rear of the vehicle. After being loaded, cables 128A are disconnected and removed from the vehicle, carrier 126A rested on dock 12, and cables 138A are disconnected from mechanism 135 and their free ends inserted into the vehicle. The vehicle open end 32 is then secured in the usual manner and driven off to be replaced by a similar vehicle to be loaded.

Specific description

Returning now to the form of FIGURES 1–4, the carrier 126 comprises a frame 284 including side plates 286 journaling a roller 288 over which belt 39 is trained.

The side plates 286 on the outwardly facing sides thereof each journal a roller 290 that rides on the upper run 292 of the respective closed loop cables 128. Cable 128 has its ends closed together to form the indicated closed loop 293 about pulleys 130 and 132 by an appropriate quick disconnect device (not shown) so that when loading is completed and the carriage 40 is disposed outside the vehicle 14, the cable 128 may have its ends disconnected and withdrawn from about pulley 130 and from the vehicle.

The prop devices 150 for the respective cables 138 and movable supports 134 each comprise a suitable post member or bar 300 that is preferably quadrilateral in transverse cross-sectional configuration and is provided at its upper end with a bracket structure 302 that journals a pulley 304 over which the cable 138 is trained (on the respective sides of the vehicle). The bars 300 are secured in any suitable manner to the truck at a bracket structure at their lower ends and at the bracket structure 302 (reference may be had to my copending application Ser. No. 712,558 for a complete description of prop devices 150, the entire disclosure of which is hereby incorporated herein by this reference).

The cables 138 are connected to the respective supports 134 as at 306 and extend upwardly about the pulleys 304 and then to the rear of the vehicle about a pulley 306 (see FIGURES 7–9) carried by U-shaped support structure or frame 308 (of mechanism 135) that is mounted on the loading dock 12 in overlying relationship to the conveyor 39. From the pulley wheel 306 on either side of the support structure 308 the respective cables 138 proceed about a second pulley 310 and then have their ends 311 detachably anchored in any suitable manner to the respective supports 136. The supports 136 move vertically along trackway 316 defined by the respective uprights 314 of structure 308.

On either side of the support 308, the respective supports 136 are respectively connected as at 319 to endless chains 318 trained over sprockets 320 and 322 (see FIGURE 3), with the sprockets 322 being keyed to a shaft 323 journaled on frame 308 and driven by a suitable electric motor 324 comprising mechanism 133. Operation of the motor 324 in either direction serves to actuate supports 134 and 136 simultaneously raise and lower them as required to facilitate the stacking of the mail bags.

The supports 136 each comprise a block structure or mounting member 202 on which is journaled ring type pulley 204 (see FIGURE 4) that forms the respective pulleys 132. The structures 202 each include a motor 206 that form the respective drive mechanisms 137, with the motors 206 being respectively coupled to pulleys for driving same in any suitable manner, as by a ring gear and spur gear arrangement. Journaled between the block structures 202 are a pair of spaced apart rollers 208 and 210 over which the upper and lower runs 139 and 140 of belt 39 are trained, in the manner indicated in FIGURE 3.

Motors 206 are arranged to drive cables 128 in synchronism so that carrier 126 is moved mechanically under the control of the operator and the various automatic positioning devices that may be employed.

After the vehicle 14 is loaded, carriage 40 is moved so that it is disposed over the loading dock 12, after which the ends of cables 128 are disconnected and the cables 128 withdrawn from vehicle 14. The ends 311 of cables 138 are disconnected and untrained from pulleys 306 and 310 for placing inside of vehicle 14, after which the doorway 32 is closed and the vehicle driven away. A vehicle 14 similarly equipped is backed into place and the cables 128 and 138 replaced to the positions illustrated for further loading of mail bags.

The belt take up device 141 comprising conveyor apparatus 38 comprises a frame 400 including upright members 402 and 404 at either end thereof joined together by suitable longitudinally extending members 406. Screw members 408 are journaled for rotation on either side of frame 400, between the respective pairs of upright members 402 and 404, and actuate the respective slide bars 410 by threaded engagement with the nut members 412 thereof. Slide bars 410 are guided in their movement longitudinally of frame 400 by guide rods 414 fixed between the respective pairs of uprights 402 and 404. The screw members 408 are synchronously driven by suitable drive mechanisms 416 powered by suitable motors. In the form shown, rollers 418, 420 and 422 are journaled between uprights 404 of frame 400, and rollers 424, 426 and 428 are journaled between the respective slide bars 410, with belt 39 being trained between these sets of rollers in the manner indicated in FIGURE 3, so that as the slide bars 410 are moved from a position adjacent the uprights 404 to uprights 402, the belt is taken up in length to maintain the necessary training tension as the carrier is moved toward frame 400. Movement of the slide bars 410 in the other direction reduces the amount of belting in take up device 141 so that carrier 126 may be advanced forwardly of the vehicle and elevated as required above the vehicle floor. Drive mechanisms 416 are operated in any suitable manner in relation to the other drive mechanisms involved, through panel 35, to automatically keep the tension in belt 39 the same regardless of the position or elevation of carrier 126 within vehicle 14.

Belt conveyor 39 is driven by motor 210 driving roller 418 through pulley belt or chain 212. Uprights 402 journal an idler roller 430 that engages the lower run 140 of belt 39 at section 432 when cables 128 have been raised to the position where section 432 of belt 39 would otherwise vibrate against frame 400.

With regard to the embodiment of FIGURES 5–10, the carrier 126A (see FIGURES 9 and 10) comprises frame 284A including side plates 286A joined together by a pair of crossbars 287 on which the frame 156 is slidably mounted. The respective side plates 286A on their outwardly facing sides journal a pair of rollers 290A that respectively ride on the upper runs 292 of the respective closed loop cables 128 that are arranged in the same manner as closed loop cables 128 of FIGURES 1–4 for cooperation between prop devices 150 and supports 136. The supports 134 and 136 are raised and lowered by mechanism 135A which is identical to mechanism 135 as indicated by corresponding reference numerals.

Frame 156 of carrier 126A comprises side members 450 joined together in spaced apart relation by a base member 452 from which is suspended a driven arrangement 157. The side members 450 mount the tubular bearing members 454 through which the cross bars 287 extend. Journaled between the side plates 450 of frame 156 are a pair of belt supporting rollers 456 and 458, with the upper run 139 of belt 39A proceeding over the top of the pulleys 456 and 458 and around the latter and between the rollers 456 and 458 and bottom plate 452 for return as bottom run 140.

The drive mechanism 157 comprises an electric motor 460 that drives pulleys 462 and 464 at either end thereof in synchronism, with the respective pulleys 462 and 464 having looped thereabout cables 464 and have their respective ends 466 and 468 anchored in any suitable manner to the respective side plates 286A as at 470. Motor 460 is adapted to be driven in opposite directions with the result that the pulleys 462 and 464 wind themselves along the respective cables 464 to move the frame 156 laterally of carrier 126A.

Side plates 286A include cable anchoring devices 172A that are fixed to the lower run of the closed loop cable 128 so that carrier 126A will be moved longitudinally of the vehicle 14 when motors 206 are driven, as described in connection with the embodiment of FIGURES 1–4.

At the mechanism 135A, the block structures 202 forming the supports 136, in place of the rollers 208 and 210, have secured therebetween spaced slide bars 472 on which are slidably mounted for shifting movement with the belt 39A are the respective rollers 208A and 210A which correspond to the respective rollers 208 and 210 of FIGURE 3. The rollers 208A and 210A are flanged at either end thereof as at 474 so that movement of belt 39 laterally of the vehicle transmits a corresponding sliding movement of the rollers 208A and 210A laterally of the respective bars 472.

The belt take up device 141A comprising the conveyor apparatus 38A comprises frame 400A that is arranged in a manner similar to frame 400 of FIGURES 1–4, but which includes depending flanges 480 at either end thereof that are mounted on slide bar 482 supported on loading dock 12 through suitable uprights 484. As indicated in FIGURE 6, the frame 400A has a width substantially less than the width of vehicle 14, and it should be proportioned such that the belt 39 can be shifted laterally of vehicle 14 to dispose the bags 44 at any one of the positions indicated in FIGURE 6 transversely of the vehicle.

The drive arrangement 155 comprises suitable electric motor 482 driving screw member 488 (through a suitable gear reducer arrangement or the like 490) that is journaled in any suitable manner on the dock 12 and engages nut members 491 (see FIGURE 8) that are carried by and are affixed to the respective lower members 406 of frame 400A in any suitable manner.

As already indicated, the drive arrangements 155 and 157 are coordinated and operated through a control panel 35 so that frames 156 and 400A move in synchronism laterally of the vehicle 14 as required to convey and deposit the respective mail bags 44 in the location desired to fully load the vehicle starting from the front end and moving rearwardly, either by forming complete vertical stacks 42 or horizontally disposed layers 113 formed one on top of the other.

The frame 400A includes the same belt slack take up arrangement described in connection with the embodiment of FIGURES 1–4, as indicated by corresponding reference numerals, and the belt 39A is driven by motor 210 driving the end roller 418 through pulley belt or chain 212, with motor 210 being carried by frame 400A on support plate 492.

The operation and movements of the conveyors and associated mechanisms herein described and illustrated are preferably completely controlled from a control panel 35, or the like, located outside of the vehicle, through any suitable wiring arrangement that incorporates the various motors and switches that have been referred to, and ordinarily only a single operator will be needed to both load the bags on the dock supported conveyor 38 and operate the machines involved to deposit the bags in the vehicle 14. The machines involved can readily be controlled to avoid dropping the bags further than the 24 inch limitation prescribed by the Post Office Department.

The bag stacking arrangement of this invention will load trucks and trailers in a fraction of the time now required and at less than half the cost, while at the same time greatly reducing the effort required by workers handling the bags. This not only greatly reduces the tie up time for each truck, but also significantly reduces the over-all cost of mail bag handling.

As to all described embodiments and methods herein disclosed, the load units or tiers formed on the loading dock are termed "partial transport vehicle load depth unit" in the appended claims.

The foregoing description and the drawings are given merely to explain and illustrate my invention since those skilled in the art who have my disclosure before them will be able to make modifications and variations therein without departing from the scope of the invention.

I claim:

1. In a bulk mail handling apparatus for loading elongated mail bags from a loading dock into the load receiving area of an end loading transport vehicle backed into load receiving position adjacent the dock to dispose its end opening to receive the bags, without workers on the dock handling the bags having to enter the vehicle, and without requiring that pallets remain with the bags after they are loaded into the vehicle, said apparatus comprising:

a conveyor apparatus mounted on the loading dock adjacent the load receiving position of the vehicle, said conveyor apparatus being positioned to be aligned with the vehicle and its end opening in the load receiving position of the vehicle, said conveyor apparatus including a conveyor belt presenting an upwardly facing load transporting surface having at least a portion thereof at an elevation for convenient manual lifting of the bags from the dock onto the conveyor surface, a mail bag receiving carriage adapted to operate between said conveyor apparatus on the dock and the load receiving position of the vehicle and proportioned to enter said vehicle end opening, said carriage being secured at either side thereof to a closed loop cable, end pulley means carried by the loading dock and the vehicle over which said cables may be trained for suspending said carriage therebetween, said pulley means being mounted for vertical movement, said conveyor belt being trained betwen said conveyor apparatus on the dock and over said carriage, means for driving said cables of moving said carriage longitudinally of the vehicle between predetermined mail bag discharging positions within the vehicle, means for simultaneously adjusting vertically said pulley means for adjusting vertically said carriage and the belt conveyor portion that is trained over said carriage, means for maintaining the tension in said belt conveyor as said carriage and belt are moved longitudinally of the vehicle, and means for driving said belt conveyor to convey mail bags placed thereon at the loading dock into the vehicle, whereby mail bags may be loaded onto said belt conveyor surface at the loading dock with the bags thereof oriented to extend longitudinally of the vehicle and said bags may be mechanically conveyed to and deposited in a stack forming position in said vehicle area while maintaining said orientation.

2. The apparatus set forth in claim 1 wherein said means for vertically adjusting said end pulley means comprises:

an actuating cable anchored adjacent one end thereof to the vehicle mounted end pulley means of the respective closed loop cables, said actuating cable extending rearwardly of the vehicle for training over intermediate pulley means to dispose the other end thereof under the loading dock mounted pulley means of the respective closed loop cables for connection thereto, and means for mechanically raising and lowering said loading dock mounted pulley means of the respective closed loop cables to simultaneously raise and lower the respective end pulley means and the closed loop cables carried thereby.

3. The apparatus set forth in claim 1 wherein said tension maintaining means comprises:

a frame mounted on the loading dock and comprising a part of said conveyor apparatus, a first series of vertically disposed rollers journaled in said frame, slide bar means carried by said frame and disposed between said rollers and the load receiving position of the vehicle, a second series of vertically disposed rollers journaled in said slide bar means, and means for moving said slide bar means toward and away from the vehicle when in its load receiving position, said belt conveyor being consecutively trained between said first and second series of rollers, and means for operating said moving means for maintaining the tension in said belt as said carriage is moved forwardly or rearwardly of the vehicle.

4. The apparatus set forth in claim 2 wherein said loading dock mounted pulley means comprises:

a pair of mounting members journaling pulley elements over which the respective closed loop cables are trained, and a pair of rollers journaled between said mounting members over which the upper and lower runs of said conveyor belt are trained.

5. The apparatus set forth in claim 1 wherein:

said conveyor apparatus and said conveyor belt have a width transversely of the vehicle that approximates the width of the vehicle area, whereby the mail bags may be loaded onto said belt conveyor surface at the loading dock in side by side tier forming relation having said orientation, and said tier of bags may be conveyed to and deposited in a stack forming position in the vehicle while maintaining said orientation.

6. The apparatus set forth in claim 1 wherein:

said carriage and said conveyor apparatus each include a frame mounted for movement laterally of the vehicle, said belt conveyor being trained between said frames, and having a width approximating the width of the mail bags, and means for synchronously shifting said farmes laterally of the vehicle to deposit mail bags carried by said belt conveyor at selected positions laterally of the vehicle.

References Cited

UNITED STATES PATENTS

| 2,870,922 | 1/1959 | Thomson. |
| 3,224,379 | 12/1965 | Miller _____ 214—13 X |
| 3,337,066 | 8/1967 | Reed et al. |

GERALD M. FORLENZA, Primary Examiner

R. J. SPAR, Assistant Examiner

U.S. Cl. X.R.

214—41, 75